(12) United States Patent
Noda

(10) Patent No.: US 7,164,538 B1
(45) Date of Patent: Jan. 16, 2007

(54) ZOOM LENS SYSTEM

(75) Inventor: Sayuri Noda, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/419,543

(22) Filed: May 22, 2006

(51) Int. Cl.
*G02B 15/14* (2006.01)

(52) U.S. Cl. ............. 359/680; 359/682; 359/683; 359/691; 359/793; 359/740; 359/717

(58) Field of Classification Search ........... 359/691, 359/680, 682, 683, 793, 740, 717
See application file for complete search history.

(56) References Cited

U.S. PATENT DOCUMENTS

| | | | | |
|---|---|---|---|---|
| 4,540,249 A * | 9/1985 | Mogami | ............. | 359/680 |
| 5,276,553 A * | 1/1994 | Tatsuno | ............. | 359/686 |
| 5,452,134 A * | 9/1995 | Sato | ............. | 359/682 |
| 6,308,011 B1 * | 10/2001 | Wachi et al. | ............. | 359/689 |
| 6,498,687 B1 * | 12/2002 | Sekita et al. | ............. | 359/680 |
| 6,545,819 B1 * | 4/2003 | Nanba et al. | ............. | 359/689 |
| 6,977,778 B1 * | 12/2005 | Nose et al. | ............. | 359/680 |
| 2003/0012567 A1 * | 1/2003 | Itoh | ............. | 396/72 |
| 2004/0136705 A1 * | 7/2004 | Suzuki | ............. | 396/72 |
| 2005/0200968 A1 * | 9/2005 | Nose et al. | ............. | 359/680 |
| 2005/0200970 A1 * | 9/2005 | Nose et al. | ............. | 359/680 |
| 2005/0231817 A1 * | 10/2005 | Matsusaka et al. | ............. | 359/680 |
| 2006/0018033 A1 * | 1/2006 | Masui et al. | ............. | 359/680 |

* cited by examiner

*Primary Examiner*—Evelyn A. Lester
(74) *Attorney, Agent, or Firm*—Banger Shia

(57) ABSTRACT

A zoom lens system comprises, successively from the object side, a first negative lens group and a positive second lens group. The first lens group includes a negative meniscus lens and a positive meniscus lens, the negative meniscus lens and the positive meniscus lens each has at least one aspherical surface. The second lens group includes a first positive auxiliary group and a positive second auxiliary group. The refractive power of the first group is $1/f_1$, the refractive power of the second group is $1/f_2$, the focal length of the whole lens system $f_w$ when the distance between the lens groups is increased, $f_T$ is the focal length of the whole lens system when the distance between the lens groups is decreased, and they satisfy the following conditional expressions of: $0.9 \leq |f_1|/(f_w \cdot f_T)^{1/2} \leq 1.1$ and $1.15 \leq |f_1|/f_2 \leq 1.35$.

6 Claims, 21 Drawing Sheets

(embodiment 1)

(embodiment 1)

(embodiment 1)
focal length : f=4.71~7.35~9.38
(F NO.) :F3.44~4.34~5.03
view angle :2ω=64.8°~42.4°~33.5°

| | r | d | nd | νd |
|---|---|---|---|---|
| 1 | 34.227 | 0.95 | 1.54340 | 56.5 |
| 2 | 2.355 | 1.12 | | |
| 3 | 6.465 | 1.31 | 1.60730 | 26.6 |
| 4 | 15.715 | 4.62~1.83~0.75 | | |
| 5 | 2.418 | 1.08 | 1.54340 | 56.5 |
| 6 | −6.679 | 0.04 | | |
| 7 | ∞ | 0.04 | | |
| 8 | −10.675 | 0.55 | 1.60730 | 26.6 |
| 9 | 5.142 | 1.22 | | |
| 10 | 5.794 | 0.57 | 1.54340 | 56.5 |
| 11 | 9.577 | 5.02~7.18~8.86 | | |
| 12 | ∞ | 0.37 | 1.51680 | 64.2 |
| 13 | ∞ | 0.10 | | |
| 14 | ∞ | 0.50 | 1.51680 | 64.2 |
| 15 | ∞ | | | |

$|f_1|/\sqrt{(f_W \cdot f_T)} = 1.02$ $|f_1|/f_2 = 1.25$ $f_{21}/f_2 = 1.15$ $f_{22}/f_2 = 4.72$ $|f_{11}/f_1| = 0.70$ $|f_{12}/f_1| = 2.54$

FIG. 1B (embodiment 1)

spherical aberration astigmatic difference distortion aberration spherical aberration astigmatic difference distortion aberration spherical aberration astigmatic difference distortion aberration (embodiment 2)

(embodiment 2)
focal length : f=4.71~7.35~9.38
(F NO.) :F3.44~4.35~5.07
view angle :2ω=65.1°~42.4°~33.5°

| | r | d | nd | νd |
|---|---|---|---|---|
| 1 | 97.281 | 0.60 | 1.52996 | 55.8 |
| 2 | 2.366 | 1.18 | | |
| 3 | 6.172 | 1.31 | 1.60730 | 26.6 |
| 4 | 15.091 | 4.68~1.85~0.75 | | |
| 5 | 2.492 | 1.12 | 1.54340 | 56.5 |
| 6 | −6.038 | 0.00 | | |
| 7 | ∞ | 0.08 | | |
| 8 | −10.367 | 0.52 | 1.60730 | 26.6 |
| 9 | 5.206 | 1.22 | | |
| 10 | 7.603 | 0.69 | 1.52996 | 55.8 |
| 11 | 14.610 | 5.08~7.29~9.02 | | |
| 12 | ∞ | 0.37 | 1.51680 | 64.2 |
| 13 | ∞ | 0.10 | | |
| 14 | ∞ | 0.50 | 1.51680 | 64.2 |
| 15 | ∞ | | | |

$|f_1|/\sqrt{(f_W \cdot f_T)} = 1.02$ $|f_1|/f_2 = 1.22$ $f_{21}/f_2 = 1.13$ $f_{22}/f_2 = 5.24$ $|f_{11}/f_1| = 0.68$ $|f_{12}/f_1| = 2.41$

FIG. 2B (embodiment 3)
focal length : f=4.71~7.34~9.37
(F NO.) :F3.43~4.28~4.94
view angle :2ω=65.0°~42.4°~33.5°

|    | r       | d            | nd      | νd   |
|----|---------|--------------|---------|------|
| 1  | 860.004 | 0.60         | 1.52996 | 55.8 |
| 2  | 2.363   | 1.19         |         |      |
| 3  | 5.107   | 0.94         | 1.60730 | 26.6 |
| 4  | 11.863  | 5.03~1.95~0.76 |       |      |
| 5  | 2.401   | 1.08         | 1.54340 | 56.5 |
| 6  | -6.725  | 0.00         |         |      |
| 7  | ∞       | 0.16         |         |      |
| 8  | -9.567  | 0.50         | 1.60730 | 26.6 |
| 9  | 4.324   | 1.24         |         |      |
| 10 | 7.239   | 0.65         | 1.52996 | 55.8 |
| 11 | 36.613  | 5.10~7.25~8.93 |       |      |
| 12 | ∞       | 0.37         | 1.51680 | 64.2 |
| 13 | ∞       | 0.10         |         |      |
| 14 | ∞       | 0.50         | 1.51680 | 64.2 |
| 15 | ∞       |              |         |      |

$|f_1|/\sqrt{(f_W \cdot f_T)} = 1.07$ $|f_1|/f_2 = 1.26$ $f_{21}/f_2 = 1.23$ $f_{22}/f_2 = 2.98$ $|f_{11}/f_1| = 0.63$ $|f_{12}/f_1| = 1.97$

FIG. 3B (embodiment 4)
focal length : f=4.71~7.35~9.37
(F NO.) :F3.53~4.45~5.17
view angle :2ω=64.9°~42.3°~33.4°

| | r | d | nd | νd |
|---|---|---|---|---|
| 1 | 29.551 | 0.65 | 1.54340 | 56.5 |
| 2 | 2.374 | 1.20 | | |
| 3 | 7.364 | 1.44 | 1.60730 | 26.6 |
| 4 | 19.197 | 4.63~1.83~0.75 | | |
| 5 | 2.443 | 1.07 | 1.54340 | 56.5 |
| 6 | -5.931 | 0.05 | | |
| 7 | ∞ | 0.17 | | |
| 8 | -6.675 | 0.50 | 1.60730 | 26.6 |
| 9 | 7.360 | 1.17 | | |
| 10 | 22.954 | 0.63 | 1.54340 | 56.5 |
| 11 | 1145.000 | 4.92~7.13~8.85 | | |
| 12 | ∞ | 0.37 | 1.51680 | 64.2 |
| 13 | ∞ | 0.10 | | |
| 14 | ∞ | 0.50 | 1.51680 | 64.2 |
| 15 | ∞ | | | |

$|f_1|/\sqrt{(f_W \cdot f_T)} = 1.01$ $|f_1|/f_2 = 1.23$ $f_{21}/f_2 = 1.07$ $f_{22}/f_2 = 7.87$ $|f_{11}/f_1| = 0.71$ $|f_{12}/f_1| = 2.80$

FIG. 4B (embodiment 4)

(embodiment 5)
focal length : f=4.71~7.35~9.37
(F NO.) :F3.46~4.37~5.07
view angle :2ω=64.7°~42.3°~33.4°

|   | r | d | nd | νd |
|---|---|---|---|---|
| 1 | 22.363 | 0.96 | 1.54340 | 56.5 |
| 2 | 2.444 | 1.45 | | |
| 3 | 8.253 | 1.25 | 1.60730 | 26.6 |
| 4 | 18.039 | 4.73~1.86~0.75 | | |
| 5 | 2.293 | 1.18 | 1.54340 | 56.5 |
| 6 | -7.260 | 0.05 | | |
| 7 | ∞ | 0.20 | | |
| 8 | -6.124 | 0.50 | 1.60730 | 26.6 |
| 9 | 6.406 | 1.04 | | |
| 10 | 13.493 | 0.58 | 1.54340 | 56.5 |
| 11 | 1143.920 | 4.98~7.19~8.90 | | |
| 12 | ∞ | 0.37 | 1.51680 | 64.2 |
| 13 | ∞ | 0.10 | | |
| 14 | ∞ | 0.50 | 1.51680 | 64.2 |
| 15 | ∞ | | | |

$|f_1|/\sqrt{(f_W \cdot f_T)} = 1.03$ $|f_1|/f_2 = 1.23$ $f_{21}/f_2 = 1.13$ $f_{22}/f_2 = 4.54$ $|f_{11}/f_1| = 0.75$ $|f_{12}/f_1| = 3.51$

FIG. 5B (embodiment 6)

(embodiment 6)
focal length : f=4.71~7.35~9.37
(F NO.) :F3.49~4.43~5.16
view angle :2ω=64.8°~42.3°~33.3°

| | r | d | nd | νd |
|---|---|---|---|---|
| 1 | 20.593 | 0.65 | 1.54340 | 56.5 |
| 2 | 2.331 | 1.20 | | |
| 3 | 7.754 | 1.65 | 1.60730 | 26.6 |
| 4 | 17.130 | 4.41~1.77~0.75 | | |
| 5 | 2.328 | 1.12 | 1.54340 | 56.5 |
| 6 | −6.848 | 0.05 | | |
| 7 | ∞ | 0.19 | | |
| 8 | −6.756 | 0.50 | 1.60730 | 26.6 |
| 9 | 6.673 | 1.18 | | |
| 10 | 12.131 | 0.59 | 1.54340 | 56.5 |
| 11 | 48.092 | 4.90~7.18~8.97 | | |
| 12 | ∞ | 0.37 | 1.51680 | 64.2 |
| 13 | ∞ | 0.10 | | |
| 14 | ∞ | 0.50 | 1.51680 | 64.2 |
| 15 | ∞ | | | |

$|f_1|/\sqrt{(f_W \cdot f_T)} = 0.97$ $|f_1|/f_2 = 1.20$ $f_{21}/f_2 = 1.10$ $f_{22}/f_2 = 5.51$ $|f_{11}/f_1| = 0.76$ $|f_{12}/f_1| = 3.39$

FIG. 6B aspherical coefficient (embodiment 1)

| surface No 2 | surface No 4 | surface No 5 | surface No 6 |
|---|---|---|---|
| K= −7.36236E−01 | K= −1.26003E+02 | K= −7.12006E−01 | K= −1.22322E+00 |
| A= 4.84691E−03 | A= 5.16410E−04 | A= 5.10942E−03 | A= −3.71664E−03 |
| B= 6.97735E−04 | B= −9.60667E−04 | B= 1.41252E−03 | B= 1.88443E−03 |
| C= 9.27702E−06 | C= 1.22990E−04 | C= −2.29772E−04 | C= 2.53502E−04 |
| D= −8.75056E−07 | D= −2.28605E−05 | D= −1.19613E−05 | D= 1.10694E−04 |

| surface No 8 | surface No 9 | surface No 10 | surface No 11 |
|---|---|---|---|
| K= 0.00000E+00 | K= 6.62825E−01 | K= 0.00000E+00 | K= 0.00000E+00 |
| A= −7.96061E−03 | A= 5.45284E−03 | A= 7.46595E−03 | A= 1.40710E−02 |
| B= 1.30372E−03 | B= 2.42115E−03 | B= −1.29510E−02 | B= −9.01851E−03 |
| C= 1.99875E−03 | C= 5.47472E−04 | C= 7.47268E−03 | C= 3.09249E−03 |
| D= 3.34358E−05 | D= 1.38773E−03 | D= −2.08814E−03 | D= 3.91631E−04 | aspherical coefficient (embodiment 2)

| surface No 2 | surface No 4 | surface No 5 | surface No 6 |
|---|---|---|---|
| K= −7.81169E−01 | K= −1.21927E+02 | K= −6.89420E−01 | K= −3.41897E+00 |
| A= 4.62888E−03 | A= 1.36946E−03 | A= 5.11887E−03 | A= −2.87923E−03 |
| B= 4.86210E−04 | B= −9.71700E−04 | B= 1.19662E−03 | B= 1.90580E−03 |
| C= 3.60903E−05 | C= 1.32337E−04 | C= −1.34518E−04 | C= 2.33491E−04 |
| D= −4.26302E−06 | D= −2.00571E−05 | D= 1.25364E−05 | D= 4.08853E−05 |

| surface No 8 | surface No 9 | surface No 10 | surface No 11 |
|---|---|---|---|
| K= 0.00000E+00 | K= 1.43335E+00 | K= 0.00000E+00 | K= 0.00000E+00 |
| A= −7.54422E−03 | A= 5.44364E−03 | A= 1.23050E−02 | A= 1.68350E−02 |
| B= 1.51504E−03 | B= 1.74387E−03 | B= −1.27860E−02 | B= −8.76128E−03 |
| C= 1.60104E−03 | C= 6.15372E−04 | C= 8.73169E−03 | C= 4.41853E−03 |
| D= −3.49876E−05 | D= 1.06454E−03 | D= −3.20545E−03 | D= −8.02758E−04 | aspherical coefficient (embodiment 3)

| surface No 2 | surface No 4 | surface No 5 | surface No 6 |
|---|---|---|---|
| K= −3.36211E+00 | K= −1.31857E+01 | K= −6.40262E−01 | K= −7.55560E+00 |
| A= 2.82935E−02 | A= −9.02408E−04 | A= 5.46946E−03 | A= 1.27564E−03 |
| B= −3.95972E−03 | B= −1.13521E−04 | B= 7.30741E−04 | B= 1.95357E−03 |
| C= 9.24725E−04 | C= −9.39441E−05 | C= 2.68196E−04 | C= −1.37508E−03 |
| D= −1.41551E−04 | D= 2.42227E−05 | D= −1.52865E−04 | D= 2.75755E−04 |

| surface No 8 | surface No 9 | surface No 10 | surface No 11 |
|---|---|---|---|
| K= 0.00000E+00 | K= 6.97417E+00 | K= 0.00000E+00 | K= 0.00000E+00 |
| A= 1.31424E−02 | A= 2.24567E−02 | A= 2.74323E−02 | A= 2.57436E−02 |
| B= −4.72192E−03 | B= −6.99487E−03 | B= −1.98446E−03 | B= −1.53708E−03 |
| C= 1.18453E−03 | C= 3.34820E−03 | C= 2.13605E−03 | C= 3.73111E−03 |
| D= 1.87261E−04 | D= 9.54605E−05 | D= −3.80720E−04 | D= −1.68129E−03 |

FIG. 7A aspherical coefficient (embodiment 4)

| surface No 2 | surface No 4 | surface No 5 | surface No 6 |
|---|---|---|---|
| K= −3.66742E−01 | K= −2.18383E+01 | K= −7.10199E−01 | K= 1.98981E+00 |
| A= 1.71261E−03 | A= −2.88336E−03 | A= 3.38073E−03 | A= −3.85293E−03 |
| B= 5.80383E−05 | B= 2.27611E−04 | B= −1.32856E−03 | B= 5.59725E−04 |
| C= 1.59053E−04 | C= −3.95702E−04 | C= 4.93604E−04 | C= −5.53083E−04 |
| D= −3.31761E−05 | D= 1.33057E−04 | D= −7.18241E−04 | D= −6.53417E−05 |

| surface No 8 | surface No 9 | surface No 10 | surface No 11 |
|---|---|---|---|
| K= 0.00000E+00 | K= 2.68128E+01 | K= 0.00000E+00 | K= 0.00000E+00 |
| A= 1.24906E−02 | A= 2.75111E−02 | A= 1.57044E−02 | A= 1.55317E−02 |
| B= −1.26197E−03 | B= −2.23880E−03 | B= −2.56005E−03 | B= −2.58735E−03 |
| C= 3.15472E−03 | C= 4.94916E−03 | C= 3.29998E−03 | C= 3.46993E−03 |
| D= 3.24418E−05 | D= 4.09609E−04 | D= −1.65049E−05 | D= −1.13131E−03 | aspherical coefficient (embodiment 5)

| surface No 2 | surface No 4 | surface No 5 | surface No 6 |
|---|---|---|---|
| K= −6.00655E−01 | K= −7.16039E+01 | K= −3.34515E−01 | K= −3.22752E+01 |
| A= 3.44117E−03 | A= −1.15650E−03 | A= 4.69937E−03 | A= 1.78154E−03 |
| B= 8.18443E−04 | B= −3.52846E−04 | B= 7.35138E−04 | B= 1.70924E−04 |
| C= −2.31170E−04 | C= −1.72748E−05 | C= 3.17308E−04 | C= −6.07973E−04 |
| D= 9.55030E−05 | D= 1.30452E−06 | D= −7.21655E−05 | D= 1.70285E−04 |

| surface No 8 | surface No 9 | surface No 10 | surface No 11 |
|---|---|---|---|
| K= 0.00000E+00 | K= 2.13464E+01 | K= 0.00000E+00 | K= 0.00000E+00 |
| A= 1.73339E−02 | A= 1.39775E−02 | A= −1.50509E−03 | A= 4.29743E−03 |
| B= −7.99838E−03 | B= −3.98003E−03 | B= −2.40619E−03 | B= −3.88036E−03 |
| C= 3.39147E−03 | C= 4.41338E−03 | C= 2.85439E−03 | C= 4.16746E−03 |
| D= −2.76583E−04 | D= 3.96756E−04 | D= −5.80940E−07 | D= −1.71460E−03 | aspherical coefficient (embodiment 6)

| surface No 2 | surface No 4 | surface No 5 | surface No 6 |
|---|---|---|---|
| K= −6.25436E−01 | K= 4.14989E+01 | K= −4.49297E−01 | K= −1.90004E+01 |
| A= 4.16788E−03 | A= −3.99431E−03 | A= 5.24868E−03 | A= 2.07963E−03 |
| B= 6.11730E−04 | B= −4.96697E−04 | B= 7.21250E−04 | B= −1.66731E−04 |
| C= −1.61700E−05 | C= 3.68251E−05 | C= 2.80205E−04 | C= −6.81268E−04 |
| D= 2.48953E−05 | D= −2.04754E−05 | D= −1.41510E−04 | D= 2.17841E−04 |

| surface No 8 | surface No 9 | surface No 10 | surface No 11 |
|---|---|---|---|
| K= 0.00000E+00 | K= 2.27383E+01 | K= 0.00000E+00 | K= 0.00000E+00 |
| A= 1.35851E−02 | A= 1.29903E−02 | A= −9.42049E−04 | A= 4.77685E−03 |
| B= −5.18318E−03 | B= −3.46376E−03 | B= −3.56225E−03 | B= −4.73236E−03 |
| C= 2.55367E−03 | C= 4.91215E−03 | C= 3.06467E−03 | C= 4.16983E−03 |
| D= −2.32180E−05 | D= −1.14685E−04 | D= −7.38434E−05 | D= −1.41188E−03 |

FIG. 7B

| | embodiment 1 | embodiment 2 | embodiment 3 | embodiment 4 | embodiment 5 | embodiment 6 |
|---|---|---|---|---|---|---|
| $\|f_1\|/\sqrt{(f_W \cdot f_T)} =$ | 1.02 | 1.02 | 1.07 | 1.01 | 1.03 | 0.97 |
| $\|f_1\|/f_2 =$ | 1.25 | 1.22 | 1.26 | 1.23 | 1.23 | 1.20 |
| $f_{21}/f_2 =$ | 1.15 | 1.13 | 1.23 | 1.07 | 1.13 | 1.10 |
| $f_{22}/f_2 =$ | 4.72 | 5.24 | 2.98 | 7.87 | 4.54 | 5.51 |
| $\|f_{11}/f_1\| =$ | 0.70 | 0.68 | 0.63 | 0.71 | 0.75 | 0.76 |
| $\|f_{12}/f_1\| =$ | 2.54 | 2.41 | 1.97 | 2.80 | 3.51 | 3.39 | attached table 1

ZOOM LENS SYSTEM

BACKGROUND OF THE INVENTION

1. Field of the Invention

The present invention relates to a lens system, and more particularly to a miniaturized, high performance, and low price zoom lens system that can ensure a good optical performance.

2. Description of the Prior Art

Since the image taking lens system has an increasingly wide range of application, particularly for the mobile phone, the image taking has become one of the necessary functions. Nowadays, a mobile phone is usually equipped with a solid image sensor and an image taking lens system, such as CCD sensor (charge coupled device) or CMOS sensor (Complementary Metal Oxide Semiconductor). To comply with the requirement of miniaturizing the solid image sensor and the image taking lens system as well as improving the performance thereof, four-piece lens system in the products needs to be miniaturized and its performance thereof also needs to be improved. Therefore, with the popularization of photographic mobile phone, the research and development of the whole group focusing structure is becoming more and more urgent. Hence, how to develop a whole group focusing structure more satisfying the user's requirements has become an important consideration of the manufacturer.

With the advancement of CCD image sensing technology in recent years, the lens taking system is developing toward high density and high definition, and accordingly, its optical performance is required to be improved. Besides, the zoom lens used in digital camera and mobile phone is also required to be more miniaturized, low priced, and light weighted. If want to double the zoom ratio of the zoom lens system, it requires that the number of the lens units is small and the performance of the lens units should be high. An ordinary zoom lens generally comprises a negative refractive first lens group and a positive refractive second lens group arranged sequentially from the object side, and the focal length changes with the distance between the lens groups. It is well known that the structure of the second lens group is comparatively simple, and the following patent documents disclose the similar lens systems:

Patent document No. 1 (JP Pt 11183616), Patent document No. 2 (JP Pt 446308), Patent document No. 3 (JP Pt 446310), Patent document No. 4 (JP Pt 456814).

Patent document No. 1 discloses an optical system comprising five lens units (first lens group consisted of two lens units and second lens group has three lens units), the optical system is miniaturized and low priced with the use of spherical lens units. However, the distance between the spherical lens units is very difficult to adjust (optical performance adjustment), it is difficult for the manufacturers to find the proper structural arrangement.

Patent Nos. 2–4 achieve miniaturization and high performance by the use of several spherical lens units, their optical performance can be adjusted easily, however, the Fno.4.6 at the wide angle end will become comparatively dark, and the use of spherical glass will increase the production cost.

To solve the abovementioned problems, and based on many years of experiences and technologies accumulated in the optical lens system field, the applicant has developed a miniaturized, high performance, and low price zoom lens system, wherein the refractive power of the respective lens groups is evenly distributed and the lens unit shape is appropriate.

The present invention has arisen to mitigate and/or obviate the afore-described disadvantages.

SUMMARY OF THE INVENTION

The primary objective of the present invention is to provide a miniaturized, and high performance zoom lens system.

The secondary objective of the present invention is to provide a zoom lens system whose zooming performance is not affected by the aspherical lens.

To achieve the abovementioned objectives, a zoom lens system provided in accordance with the present invention comprises, successively from the object side, a first lens group and a second lens group. The focal length of the zoom lens systems changes with the distance between the lens groups. The refractive power of the first group is $1/f_1$, the refractive power of the second group is $1/f_2$, the focal length of the whole lens system $f_w$ when the distance between the two lens groups is increased, $f_T$ is the focal length of the whole lens system when the distance between the two lens groups is decreased, and they satisfy the following conditional expressions:

$$0.9 \leq |f_1|/(f_w \cdot f_T)^{1/2} \leq 1.1$$

$$1.15 \leq |f_1|/f_2 \leq 1.35$$

The first lens group has negative refractive power and includes a negative meniscus lens with a convex surface facing the object side, and a positive meniscus lens with a convex surface facing the object side, the negative meniscus lens and the positive meniscus lens each has at least one aspherical surface. The second lens group has positive refractive power and includes a first auxiliary group having positive refractive power and a second auxiliary group having positive refractive power, the first auxiliary group includes a bi-convex lens and a bi-concave lens, the second auxiliary group includes a positive meniscus lens with a convex surface facing the object side. The mentioned above is the characteristic of the zoom lens system of the present invention.

Then the function and the effect generated by the configuration of the zoom lens system are described as follows: due to the zoom lens system in accordance with the present invention comprises, successively from the object side, a first lens group and a second lens group. The first lens group has negative refractive power and includes a negative meniscus lens with a convex surface facing the object side, and a positive meniscus lens with a convex surface facing the object side, the negative meniscus lens and the positive meniscus lens each has at least one aspherical surface. The second lens group has positive refractive power and includes a first auxiliary group having positive refractive power and a second auxiliary group having positive refractive power, the first auxiliary group includes a bi-convex lens and a bi-concave lens, the second auxiliary group includes a positive meniscus lens with a convex surface facing the object side. Hence, the second lens group comprises three lens elements, the whole lens system in accordance with the present invention comprises five lens elements, and thus the miniaturization is achieved.

The refractive power of the first group is $1/f_1$, the refractive power of the second group is $1/f_2$, the focal length of the whole lens system $f_w$ when the distance between the two lens groups is increased, $f_T$ is the focal length of the whole lens system when the distance between the two lens groups is decreased, and they satisfy the first and second conditional expressions (1) and (2)

$$0.9 \leq |f_1|/(f_w \cdot f_T)^{1/2} \leq 1.1$$

$$1.15 \leq |f_1|/f_2 \leq 1.35$$

These two conditional expressions are characterized in that: when the whole lens system is zooming, and when the value of the conditional expression (1) is equal to 1, the whole length of the wide angle side and the telephoto side are equal to each other, and the whole length change is the minimum in terms of optical zooming.

When the value of the conditional expression (1) is greater than 1, the whole length of the wide angle side reaches its maximum value, and when the value of the conditional expression (1) is smaller than 1, the whole length of the wide angle reaches its minimum value. Therefore, if the value of the conditional expression (1) is greater than 1, it hopes that the change in whole length is not great.

If the value of the conditional expression (1) is designed to be close to 1, in order to make the wide angle side approximately equal to the telephoto side, and if the image surface of the first lens group is fixed, then the image surface of the second lens group should be located at two positions of bi-focal lens system, and in this way, a simply structured lens system can be formed.

If the value of the conditional expression (1) is smaller than 0.9, the total length at the telephoto side will be increased, and the miniaturization of the lens barrel will become impossible. Furthermore, the spherical aberration at the telephoto side, the astigmatism aberration, the coma aberration and the distortion aberration at the wide angle side will also become difficult.

If the value of the conditional expression (1) is greater than 1.1, in order to increase the total length of the telephoto side, the outer diameter of the lens should be increased, and then the size of the whole lens system is increased. Hence, the conditional expression (1) allows each of the invention is set well, and can suppress the whole length, thus achieving miniaturization and ensuring good optical performance.

If the value of the above conditional expression (2) is smaller than 1.15, in order to increase the displacement distance of the second lens group, the distance between the first lens group and the second lens group of the wide angle side must be lengthened, and as a result, the whole lens system will be lengthened. Meanwhile, the diameter of the front spherical surface also will be increased.

If the value of the above conditional expression (2) is greater than 1.35, the image surface distortion of the wide angle side and the spherical aberration of the telephoto side will become difficult. As mentioned above, the distribution of the refractive power of the respective lens groups or the arrangement of the lens shape can ensure a good optical performance, therefore, the present invention can provide a low cost and high performance portable zoom lens system.

Besides, the focal length of the first auxiliary group of the second lens group is $f_{21}$, the focal length of the second auxiliary group of the second lens group is $f_{22}$, and they satisfy the following conditional expressions:

$$1.0 \leq f_{21}/f_2 \leq 1.3 \quad (3)$$

$$2 \leq f_{22}/f_2 \leq 9 \quad (4)$$

If the value of the above conditional expression (3) is smaller than 1.0, the refractive power of the second lens group and the first auxiliary group will become too strong. If the lenses are plastic, temperature change will increase the spherical aberration of the telephoto side. Meanwhile, the aberration at the focal point will become impossible to control.

If the value of the above conditional expression (3) is greater than 1.3, the refractive power of the second lens group and the first auxiliary group will be weakened, and the refractive power of the second auxiliary group will become too strong. If the lenses are plastic, temperature change will increase the spherical aberration of the telephoto and the aberration of the focal point.

If the value of the above conditional expression (4) is smaller than 2, the refractive power of the second lens group and the second auxiliary group will become too strong. If the lenses are plastic, temperature change will increase the spherical aberration of the telephoto side. If the lenses are plastic, temperature change will increase the spherical aberration of the telephoto and the aberration of the focal point.

If the value of the above conditional expression (4) is greater than 9, temperature change will increase the spherical aberration of the telephoto and the aberration of the focal point.

In addition, the focal length of the negative meniscus lens of the first lens group is $f_{11}$, the focal length of the positive meniscus lens is $f_{12}$, and they satisfy the following conditional expressions:

$$0.55 \leq |f_{11}/f_1| \leq 0.85$$

$$1.5 \leq |f_{12}/f_1| \leq 4.0$$

If the value of the above conditional expression (5) is smaller than 0.55, the refractive power of the first lens group G1 and the first lens will become too strong. If the lenses are plastic, temperature change will increase the image surface distortion of the wide angle side will be increased. Meanwhile, the aberration at the focal point will be uncontrollable.

If the value of the above conditional expression (5) is greater than 0.85, the negative refractive power of the lens will be weakened, the chromatic aberration of the first lens group G1 will be incomplete and the performance of the lens will be worsened.

If the value of the above conditional expression (6) is smaller than 1.5, the refractive power of the first lens group and the first lens will become too strong. If the lenses are plastic, temperature change will increase the image surface distortion of the wide angle side will be increased. Meanwhile, the aberration at the focal point will be unallowable.

If the value of the above conditional expression (6) is greater than 4.0, the negative refractive power of the lens will become too weak, the chromatic aberration of the first lens group will be incomplete and the performance of the lens will be worsened.

All the negative and positive meniscus lenses of the first lens group, the bioconvex, bioconcave lenses and the positive meniscus lenses of the second lens group are optimally made of plastic. In view of the structure, the aspherical lenses can be easily produced.

BRIEF DESCRIPTION OF THE DRAWINGS

FIG. 1B shows the optical data of the first embodiment the present invention;

FIG. 2B shows the optical data of the second embodiment the present invention;

FIG. 3B shows the optical data of the third embodiment the present invention;

FIG. 4B shows the optical data of the fourth embodiment the present invention;

FIG. 5B shows the optical data of the fifth embodiment the present invention;

FIG. 6B shows the optical data of the sixth embodiment the present invention;

FIG. 7A shows the data of the aspherical surface of the lens system in accordance with the embodiments 1–3;

FIG. 7B shows the data of the aspherical surface of the lens system in accordance with the embodiments 4–6; and Table 1 shows the real data of the embodiments 1–6.

DETAILED DESCRIPTION OF THE PREFERRED EMBODIMENTS

Figure 1A:
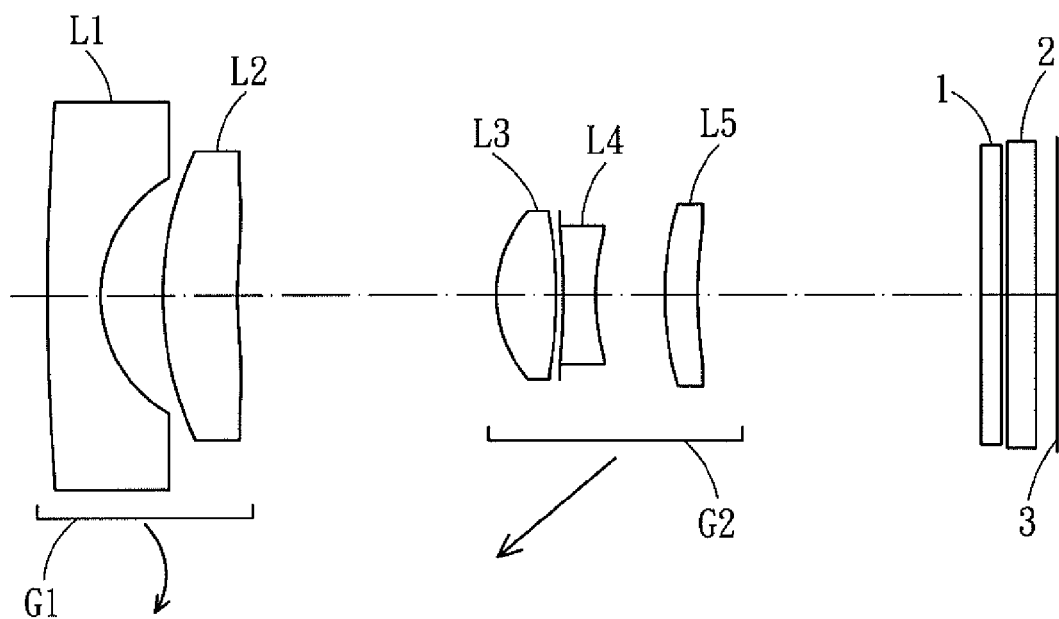
FIG. 1A is an illustrative view of showing the configuration of a four-piece lens assembly in accordance with a first embodiment the present invention.
Figure 1C:
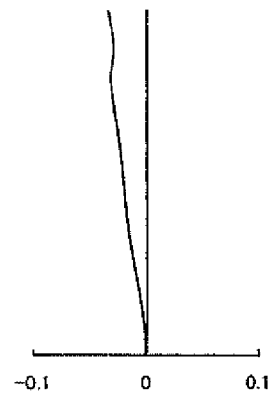
FIG. 1C shows the aberration correction of the first embodiment the present invention.
Figure 1C:
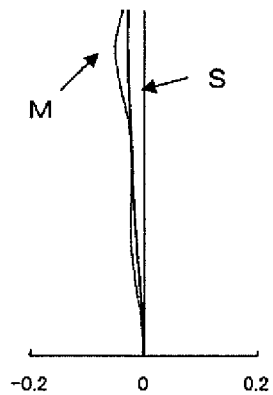
Figure 1C:
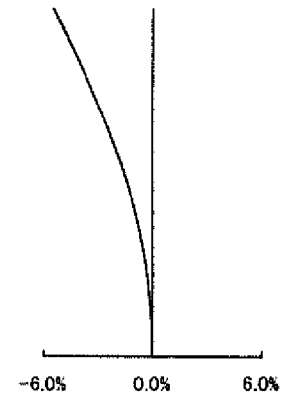
Figure 1C:
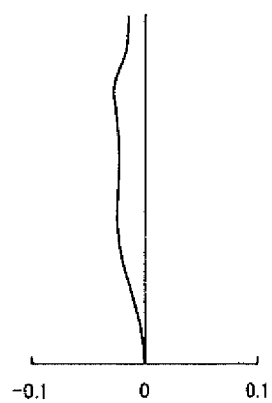
Figure 1C:
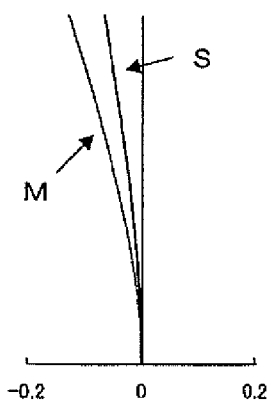
Figure 1C:
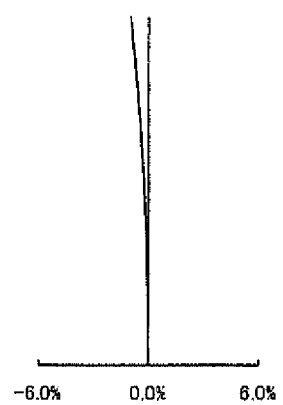
Figure 1C:
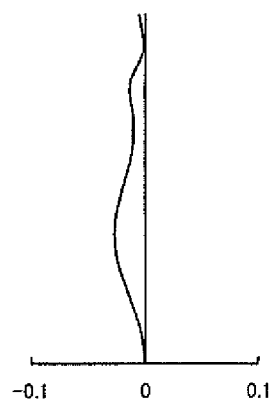
Figure 1C:
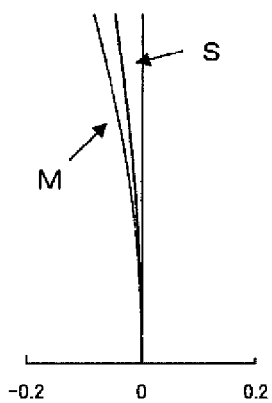
Figure 1C:
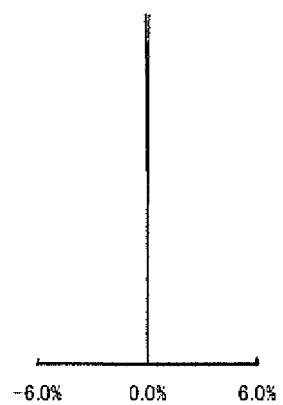
Figure 2A:
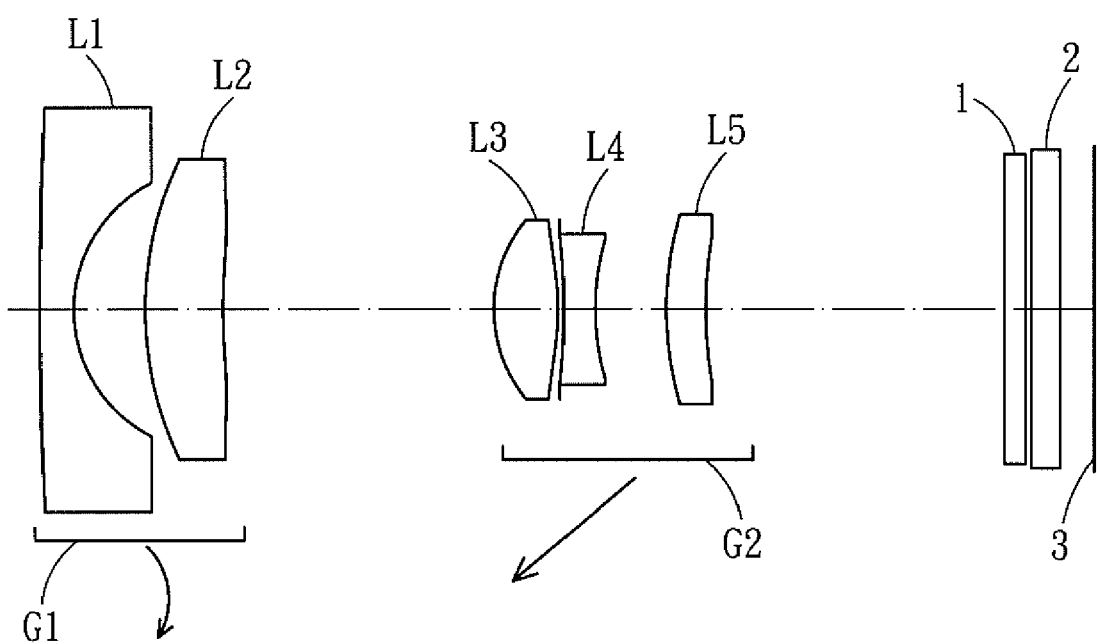
FIG. 2A is an illustrative view of showing the configuration of a four-piece lens assembly in accordance with a second embodiment the present invention.
Figure 2C:
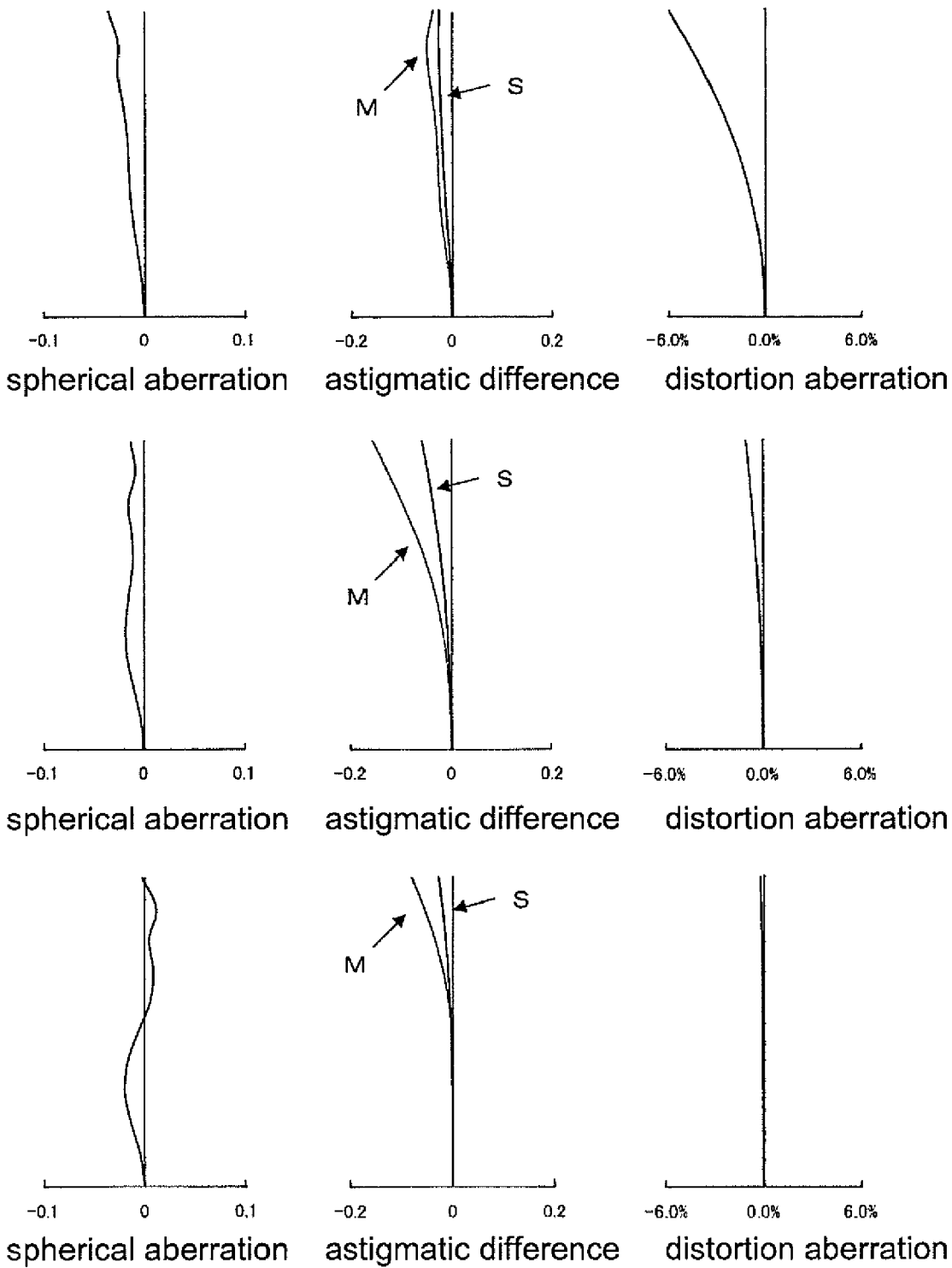
FIG. 2C shows the aberration correction of the second embodiment the present invention.
Figure 3A:
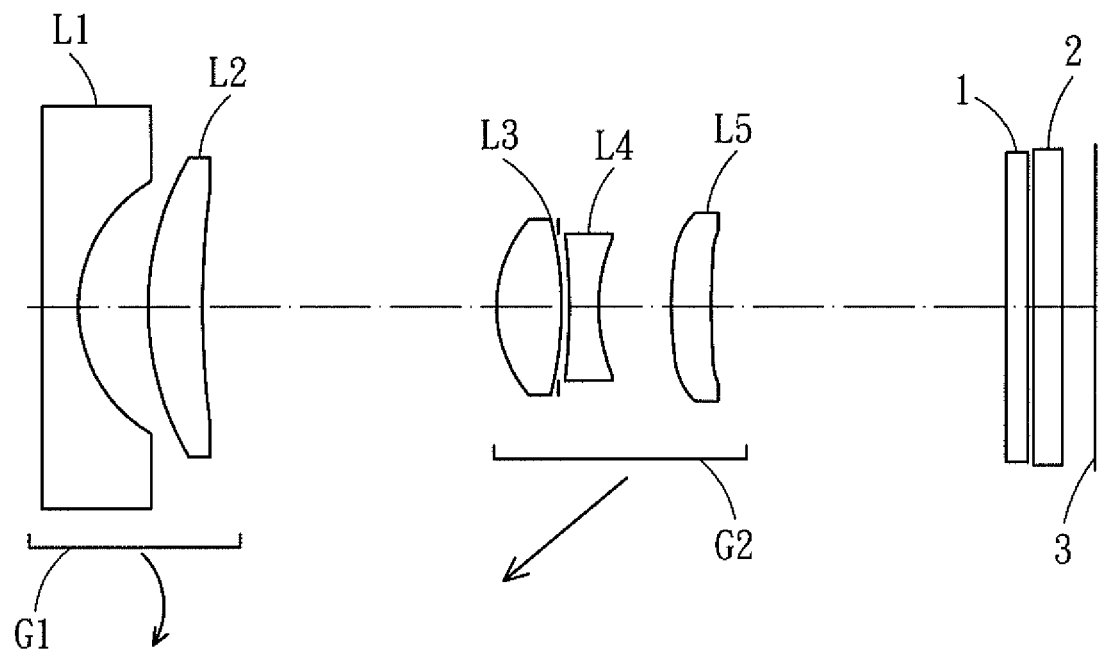
FIG. 3A is an illustrative view of showing the configuration of a four-piece lens assembly in accordance with a third embodiment the present invention.
Figure 3C:
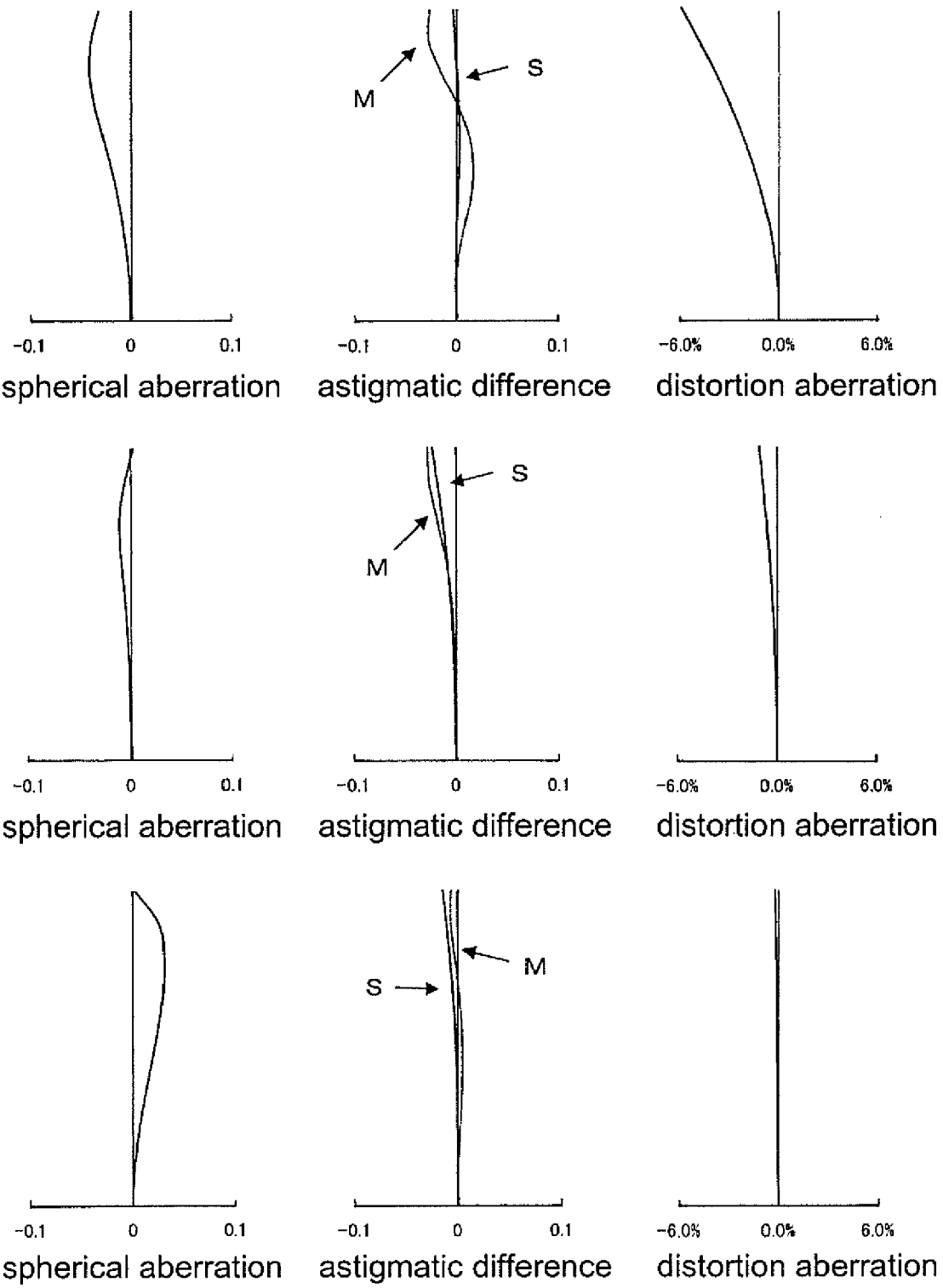
FIG. 3C shows the aberration correction of the third embodiment the present invention.
Figure 4A:
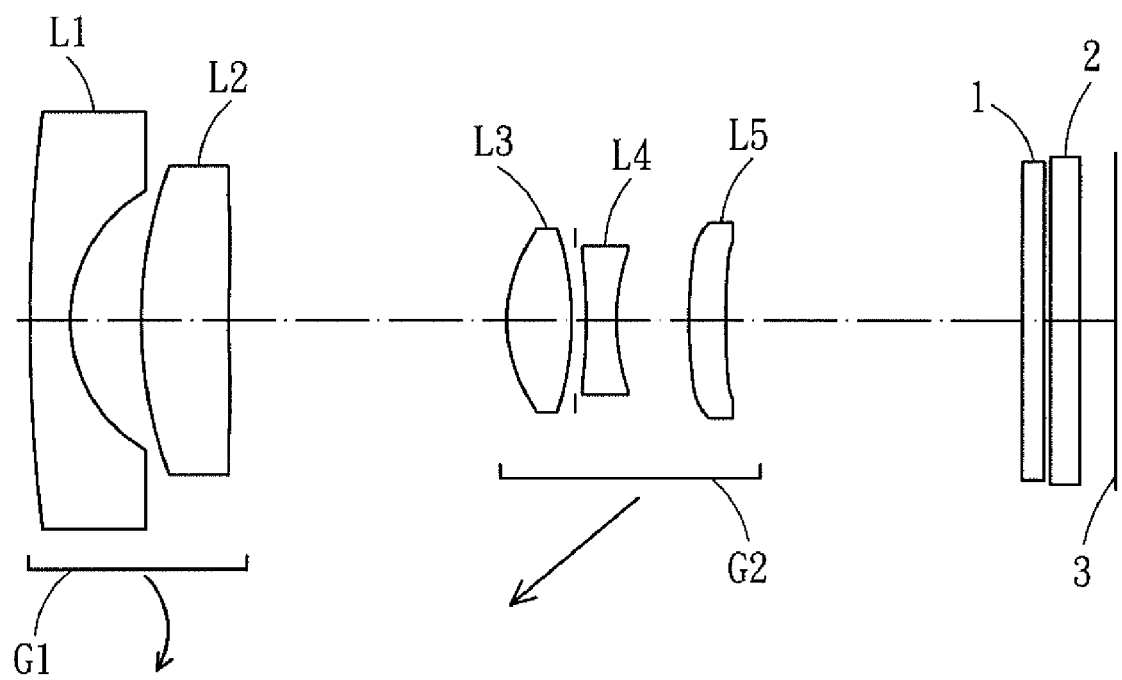
FIG. 4A is an illustrative view of showing the configuration of a four-piece lens assembly in accordance with a fourth embodiment the present invention.
Figure 4C:
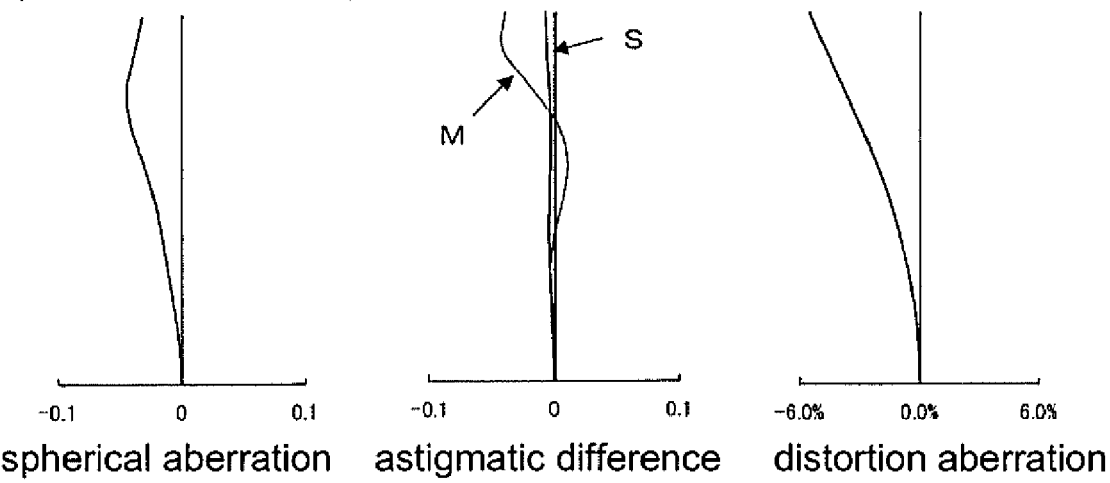
FIG. 4C shows the aberration correction of the fourth embodiment the present invention.
Figure 4C:
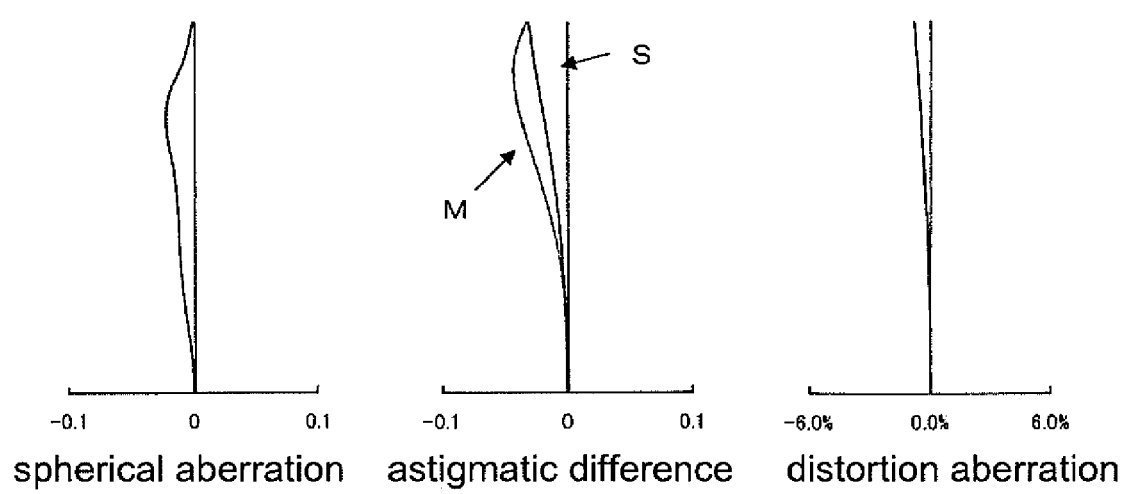
Figure 4C:
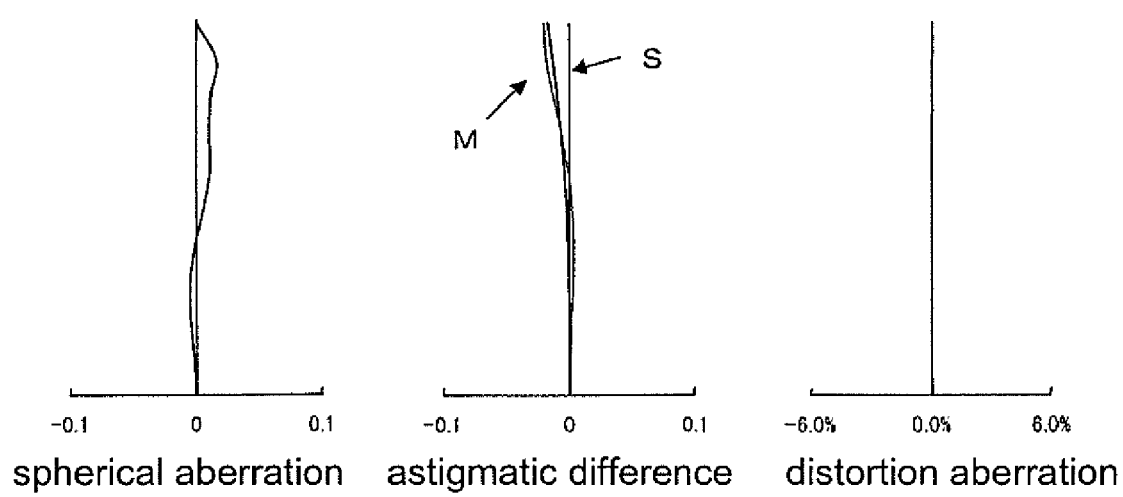
Figure 5A:
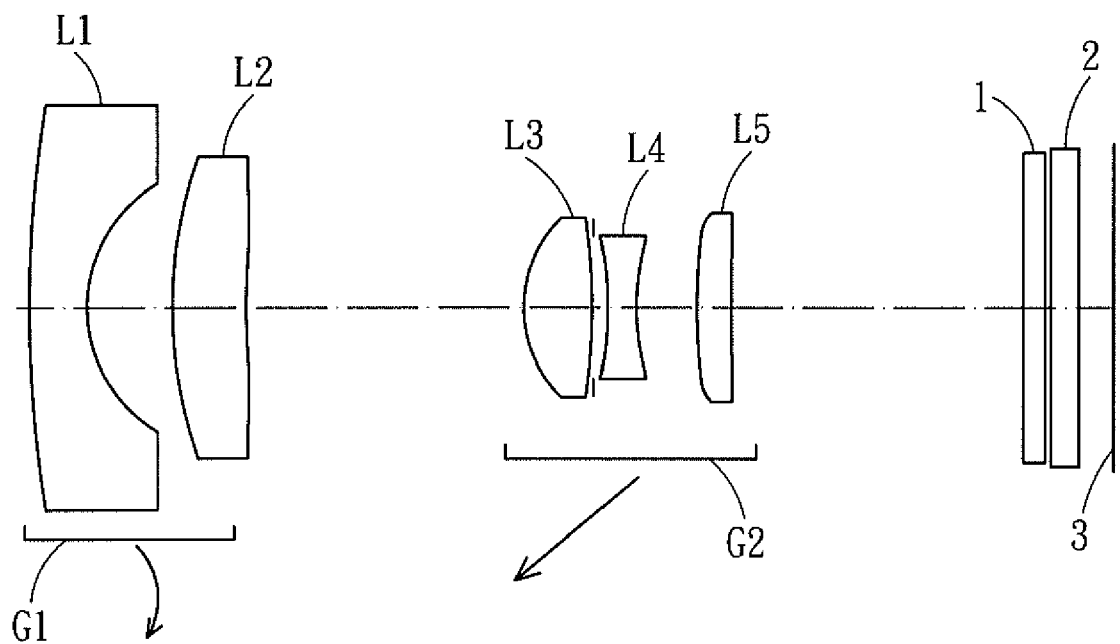
FIG. 5A is an illustrative view of showing the configuration of a four-piece lens assembly in accordance with a fifth embodiment the present invention.
Figure 5C:
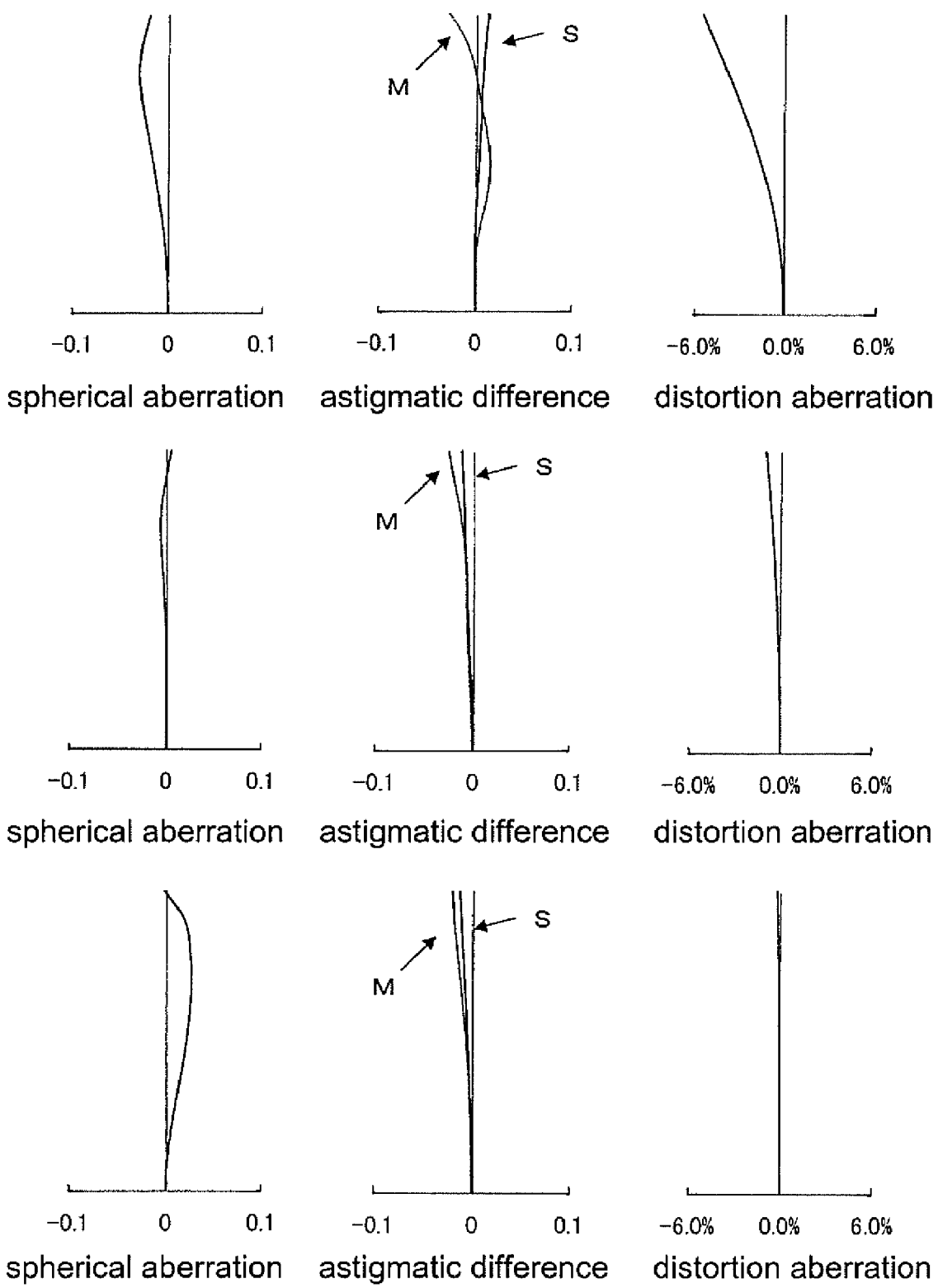
FIG. 5C shows the aberration correction of the fifth embodiment the present invention.
Figure 6A:
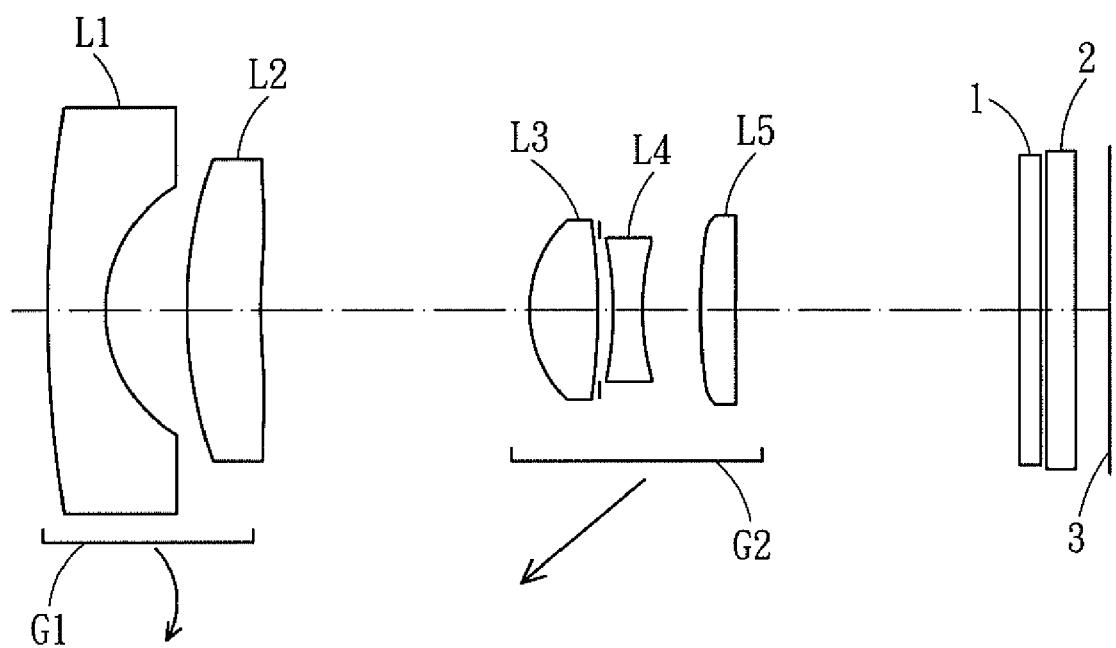
FIG. 6A is an illustrative view of showing the configuration of a four-piece lens assembly in accordance with a sixth embodiment the present invention.
Figure 6C:
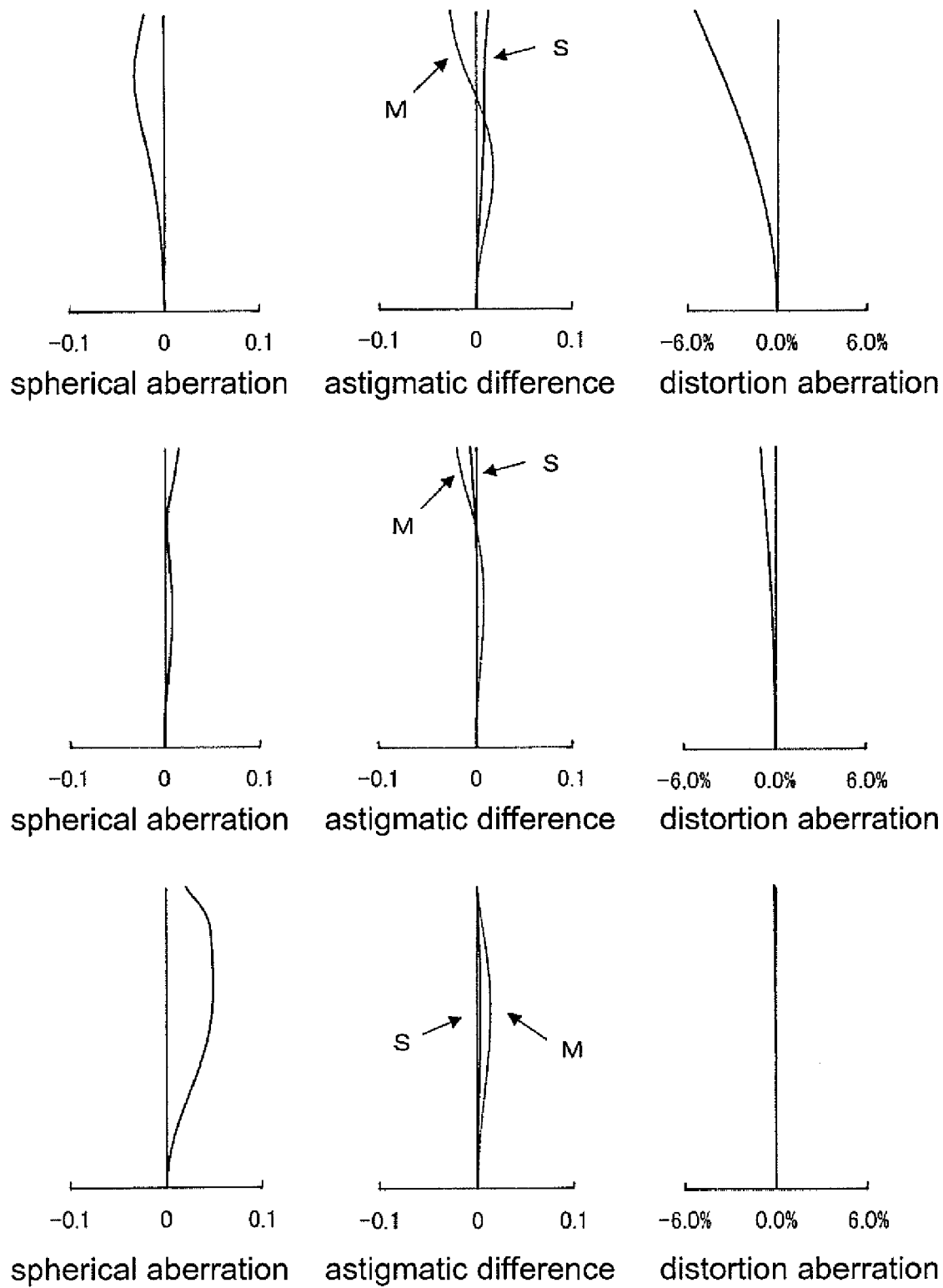
FIG. 6C shows the aberration correction of the sixth embodiment the present invention.

The foregoing, and additional objects, features and advantages of the present invention will become apparent from the following detailed description of preferred embodiments thereof, taken in conjunction with the accompanying FIGS. 1–6. In which, FIGS. 1A–6A show the configuration of a lens system in accordance with the embodiments 1–6 of the present invention, FIGS. 1B–6B show the optical data of the embodiments 1–6 of the present invention, FIGS. 1C–6C show the aberration correction of the embodiments 1–6 of the present invention, and FIG. 7 is a diagram for showing the data of the aspherical surface of the lenses in accordance with the embodiments 1–6. The two-lens-group type zoom lens system of the present invention is suitable for use as a hidden zoom lens in portable photographing device (such as digital camera, mobile phone, or the like) or the video monitoring system.

FIGS. 1A–6A illustrates the arrangements of the optical systems of the respective embodiments. The zoom lens system of the first embodiment comprises, successively from the object side along the optical axis, a first lens group G1 (front group), a second lens group G2 (rear group), two pieces of flat parallel glass 1, 2, and an image plane 3. The focal length of the zoom lens system is adjusted by changing the distance between the first and second lens groups G1 and G2.

The first lens group G1 has negative refractive power and comprises a negative meniscus lens L1 with a convex surface facing the object side, and a positive meniscus lens L2 with a convex surface facing the object side (two lens elements lens group).

The second lens group G2 has positive refractive power and comprises, successively from the object side, a first auxiliary group having positive refractive power and a second auxiliary group having positive refractive power. The first auxiliary group includes a bi-convex lens L3 and a bi-concave lens L4. The second auxiliary group includes a positive meniscus lens L5 with a convex surface facing the object side. Therefore, the second lens group G2 comprises three lens elements, and the whole lens system in accordance with the present invention comprises five lens elements, and all the lens elements are made of plastic.

The aforementioned negative meniscus lens L1 and the positive meniscus lens L2 each has at least one aspherical surface, in the respective embodiments, the image side of the negative meniscus lens L1 and the positive meniscus lens L2 are aspherical.

The wide angle side of the respective embodiments is fixed, if the first lens group G1 and the second lens group G2 move in the direction of the arrow, the present invention can be fixed at the wide angle side.

The two pieces of flat parallel glass 1, 2 serve as an IR cut filter and a cover glass. If the IR cut filter has the function of over glass, it only needs to use one piece of parallel glass. Solid state imaging device, such as CCD, is disposed on the image plane 3.

With reference to FIGS. 1B–6B, which illustrate the elements of the lens system of respective embodiments, and the aberration correction data thereof. At the top of the figures are shown the various factors of the lens assembly, including focal length f, F Number, angle of view 2ω. These data are represented by wide angle, middle position and telephoto side, respectively.

The data symbols in the attached table are explained as follows: 1, 2 . . . 15 represent the sequence numbers of the surfaces of the respective lenses from the object side. r represents the paraxial radius (mm) of curvature. For example, the surface Nos 11–14 are two sides of the flat parallel glass 1 and 2, therefore both of them are ∞. d represents surface separation (mm), nd represents the refractive index of the respective lenses L1–L5 and the flat parallel glass 1 and 2, and vd represents aberration coefficient of the respective lenses L1–L5 and the flat parallel glass 1 and 2.

Meanwhile, the surface separation d between the surfaces 4 and 5 (the distance between the first lens group G1 and the second lens group G2), and the surface separation d between the surfaces 10 and 11 (the distance between the second lens group G1 and the flat parallel glass 1) are represented by wide angle, middle position and telephoto side, respectively.

$f_1$ represents the focal length of the first lens group G1, $f_2$ represents the focal length of the second lens group G2, the refractive power of the first group is $1/f_1$, the refractive power of the second group is $1/f_2$, $f_w$ represents the focal length of the whole lens system when the distance between the lens groups is increased (wide angle side), $f_T$ represents the focal length of the whole lens system when the distance between the lens groups is decreased (telephoto side), $f_{11}$ represents the focal length of the negative meniscus lens L1 of the first lens group G1, $f_{12}$ represents the focal length of the positive meniscus lens L2, $f_{21}$ represents the focal length of the first auxiliary group, and $f_{22}$ represents the focal length of the second auxiliary group.

Referring to FIGS. 1C–6C, which show the aberration correction of the embodiments 1–6 of the present invention, the aberration correction diagrams include spherical aberration, astigmatic difference and distortion aberration, and are all about data of the line d. The astigmatic difference is the data of the sagittal image surface (S) and the meridional image surface (M). These aberration correction diagrams are represented by wide angle (W), middle position (M) and telephoto side (T), respectively. It is understood from these diagrams that the aberration not in the application can be compensated and corrected.

FIGS. 7A and 7B illustrate the data of the aspherical surfaces. The coefficients of the aspherical surfaces are indicated by A, B, C and D. The height H of the optical axis, and the deflection X of the optical axis are used as surface apex benchmark. The present invention can satisfy the following equation:

$$X = (1/R) H^2/[1 + \{1 - (1+K)(H/R)^2\}^{1/2}] + AH^4 + BH^6 + CH^8 + DH^{10}$$

where R represents the paraxial radius of curvature, K represents the conical coefficients, E represents the aspherical coefficient, and E-03 represents $10^{-3}$.

The value of $|f_1|/(f_w \cdot f_T)^{1/2}$、$|f_1|/f_2$、$f_{21}/f_2$、$f_{22}/f_2$、$|f_{11}|/f_1|$、$|f_{12}|/f_1|$ preferably satisfies the following expression:

$$0.9 \leq |f_1|/(f_w \cdot f_T)^{1/2} \leq 1.1 \tag{1}$$

If the value of the conditional expression (1) is smaller than 0.9, the total length at the telephoto side will be increased, and the miniaturization of the lens barrel will become difficult. Furthermore, the spherical aberration at the telephoto side, the astigmatism aberration, the coma aberration and the distortion aberration at the wide angle side will also become difficult.

If the value of the conditional expression (1) is greater than 0.9, the total length of the wide angle side is increased, and the diameter of the front spherical surface is increased, as a result, the whole lens system will be large-scaled.

$$1.15 \leq |f_1|/f_2 \leq 1.35 \tag{2}$$

If the value of the above conditional expression (2) is smaller than 1.15, in order to increase the displacement distance of the second lens group, the distance between the first lens group G1 and the second lens group G2 of the wide angle side must be lengthened, and as a result, the whole lens system will be lengthened. Meanwhile, the diameter of the front spherical surface also will be increased. If the value of the above conditional expression (2) is greater than 1.35, the image surface distortion of the wide angle side and the spherical aberration of the telephoto side will become difficult.

$$1.0 \leq f_{21}/f_2 \leq 1.3 \tag{3}$$

If the value of the above conditional expression (3) is smaller than 1.0, the refractive power of the second lens group G2 and the first auxiliary group will become too strong. If the lenses are plastic, temperature change will increase the spherical aberration of the telephoto side. Meanwhile, the aberration at the focal point will be unallowable. If the value of the above conditional expression (3) is greater than 1.3, the refractive power of the second lens group G2 and the first auxiliary group will be weakened, and the refractive power of the second auxiliary group will become too strong. If the lenses are plastic, temperature change will increase the spherical aberration of the telephoto and the aberration of the focal point.

$$2 \leq f_{22}/f_2 \leq 9 \tag{4}$$

If the value of the above conditional expression (4) is smaller than 2, the refractive power of the second lens group G2 and the second auxiliary group will become too strong. If the lenses are plastic, temperature change will increase the spherical aberration of the telephoto side. If the lenses are plastic, temperature change will increase the spherical aberration of the telephoto and the aberration of the focal point. If the value of the above conditional expression (4) is greater than 9, temperature change will increase the spherical aberration of the telephoto and the aberration of the focal point.

$$0.55 \leq |f_{11}|/f_1| \leq 0.85 \tag{5}$$

If the value of the above conditional expression (5) is smaller than 0.55, the refractive power of the first lens group GI and the first lens L1 will become too strong. If the lenses are plastic, temperature change will increase the image surface distortion of the wide angle side will be increased. Meanwhile, the aberration at the focal point will be unallowable. If the value of the above conditional expression (5) is greater than 0.85, the negative refractive power of the lens L1 will be weakened, the chromatic aberration of the first lens group G1 will be incomplete and the performance of the lens will be worsened.

$$1.5 \leq |f_{12}|/f_1| \leq 4.0 \tag{6}$$

If the value of the above conditional expression (6) is smaller than 1.5, the refractive power of the first lens group G1 and the first lens L2 will become too strong. If the lenses are plastic, temperature change will increase the image surface distortion of the wide angle side will be increased. Meanwhile, the aberration at the focal point will be unallowable.

If the value of the above conditional expression (6) is greater than 4.0, the negative refractive power of the lens L2 will become too weak, the chromatic aberration of the first lens group G1 will be incomplete and the performance of the lens will be worsened.

The real data of the embodiments 1–6 are shown in table 1. The respective embodiments only comprises five lens units (the first lens group includes 2 lens units and the second lens group includes 3 lens units), a lens system consisted of so few lens units can definitely be miniaturized, and due to the lenses are plastic, it makes the lens system compact, thus effectively reducing the cost. Meanwhile, the distribution of the refractive power of the respective lens groups or the arrangement of the lens shape can ensure a good optical performance.

While we have shown and described various embodiments in accordance with the present invention, it should be clear to those skilled in the art that further embodiments may be made without departing from the scope of the present invention.

What is claimed is:

1. A zoom lens system comprising, successively from the object side, a first lens group and a second lens group; wherein:

the first lens group has negative refractive power and includes a negative meniscus lens with a convex surface facing the object side, and a positive meniscus lens with a convex surface facing the object side, the negative meniscus lens and the positive meniscus lens each has at least one aspherical surface;

the second lens group has positive refractive power and includes a first auxiliary group having positive refractive power and a second auxiliary group having positive refractive power, the first auxiliary group includes a bi-convex lens and a bi-concave lens, the second auxiliary group includes a positive meniscus lens with a convex surface facing the object side; and the refractive power of the first group is $1/f_1$, the refractive power of the second group is $1/f_2$, the focal length of the whole lens system $f_w$ when the distance between the two lens groups is increased, $f_T$ is the focal length of the whole lens system when the distance between the two lens groups is decreased, and they satisfy the following conditional expressions:

$$0.9 \leq |f_1|/(f_w \cdot f_T)^{1/2} \leq 1.1$$

$$1.15 \leq |f_1|/f_2 \leq 1.35.$$

2. The zoom lens system as claimed in claim 1, wherein the focal length of the first auxiliary group of the second lens group is $f_{21}$, the focal length of the second auxiliary group of the second lens group is $f_{22}$, and they satisfy the following conditional expressions:

$$1.0 \leq f_{21}/f_2 \leq 1.3$$

$$2 \leq f_{22}/f_2 \leq 9.$$

3. The zoom lens system as claimed in claim 1, wherein the focal length of the negative meniscus lens of the first lens group is $f_{11}$, the focal length of the positive meniscus lens is $f_{12}$, and they satisfy the following conditional expressions:

$$0.55 \leq |f_{11}/f_1| \leq 0.85$$

$$1.5 \leq |f_{12}/f_1| \leq 4.0.$$

4. The zoom lens system as claimed in claim 1, wherein the first and second lens groups are made of plastic.

5. The zoom lens system as claimed in claim 2, wherein the first and second lens groups are made of plastic.

6. The zoom lens system as claimed in claim 3, wherein the first and second lens groups are made of plastic.

* * * * *